(12) United States Patent
Liu et al.

(10) Patent No.: US 8,325,019 B2
(45) Date of Patent: Dec. 4, 2012

(54) MOTION TRACKING TECHNIQUES FOR RFID TAGS

(75) Inventors: Xu Liu, Cupertino, CA (US); Jonathan J. Hull, San Carlos, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/880,869

(22) Filed: Sep. 13, 2010

(65) Prior Publication Data

US 2012/0062381 A1  Mar. 15, 2012

(51) Int. Cl.
 *H04Q 5/22* (2006.01)
(52) U.S. Cl. .................. 340/10.5; 340/10.1; 340/572.1
(58) Field of Classification Search .......... 340/10.1, 340/572.1, 505
See application file for complete search history.

(56) References Cited

U.S. PATENT DOCUMENTS

| | | | |
|---|---|---|---|
| 4,862,160 A | 8/1989 | Ekchian et al. |
| 5,287,414 A | 2/1994 | Foster |
| 5,666,490 A | 9/1997 | Gillings et al. |
| 5,689,238 A | 11/1997 | Cannon, Jr. et al. |
| 5,706,452 A | 1/1998 | Ivanov |
| 5,732,401 A | 3/1998 | Conway |
| 5,926,116 A | 7/1999 | Kitano et al. |
| 5,933,829 A | 8/1999 | Durst et al. |
| 5,936,527 A | 8/1999 | Isaacman et al. |
| 5,939,981 A | 8/1999 | Renney |
| 5,942,987 A | 8/1999 | Heinrich et al. |
| 5,974,202 A | 10/1999 | Wang et al. |
| 5,978,477 A | 11/1999 | Hull et al. |
| 5,978,773 A | 11/1999 | Hudetz et al. |
| 6,008,727 A | 12/1999 | Want et al. |
| 6,055,544 A | 4/2000 | DeRose et al. |
| 6,100,804 A | 8/2000 | Brady et al. |
| 6,104,834 A | 8/2000 | Hull |
| 6,108,656 A | 8/2000 | Durst et al. |
| 6,122,520 A | 9/2000 | Want et al. |
| 6,127,928 A | 10/2000 | Issacman et al. |
| 6,130,621 A | 10/2000 | Weiss |
| 6,176,425 B1 | 1/2001 | Harrison et al. |
| 6,195,006 B1 | 2/2001 | Bowers et al. |
| 6,199,048 B1 | 3/2001 | Hudetz et al. |

(Continued)

FOREIGN PATENT DOCUMENTS

CA 2354464 A1 2/2002

(Continued)

OTHER PUBLICATIONS

Oka et al., Distributed Target Tracking Using Singal Strength Measurements by a Wireless Sensor Network, IEEE Journal on Selected Areas in Communications, IEEE Service Center, Piscataway, US, vol. 28, No. 7, Sep. 2010, 10 pages.

(Continued)

*Primary Examiner* — Travis Hunnings
(74) *Attorney, Agent, or Firm* — Kilpatrick Townsend & Stockton LLP (57) ABSTRACT

Techniques for tracking the motion of an RFID tag using signal strength information. A single antenna of an RFID reader may be used to take a sequence of readings from an RFID tag in motion. A signal strength indicator (e.g., received signal strength indicator (RSSI)) is determined for each reading. The sequence of RSSIs is then used to estimate a path of motion of the RFID tag and the direction of motion of the RFID tag along the path.

10 Claims, 8 Drawing Sheets

U.S. PATENT DOCUMENTS

| | | |
|---|---|---|
| 6,204,764 B1 | 3/2001 | Maloney |
| 6,232,870 B1 | 5/2001 | Garber et al. |
| 6,249,226 B1 | 6/2001 | Harrison et al. |
| 6,259,367 B1 | 7/2001 | Klein |
| 6,260,049 B1 | 7/2001 | Fitzgerald et al. |
| 6,262,662 B1 | 7/2001 | Back et al. |
| 6,278,413 B1 | 8/2001 | Hugh et al. |
| 6,294,998 B1 | 9/2001 | Adams et al. |
| 6,297,737 B1 | 10/2001 | Irvin |
| 6,304,182 B1 | 10/2001 | Mori et al. |
| 6,307,473 B1 | 10/2001 | Zampini et al. |
| 6,324,353 B1 | 11/2001 | Laussermair et al. |
| 6,326,889 B1 | 12/2001 | Van Horn et al. |
| 6,333,690 B1 | 12/2001 | Nelson et al. |
| 6,335,685 B1 | 1/2002 | Schrott et al. |
| 6,337,619 B1 | 1/2002 | Kowalski et al. |
| 6,340,931 B1 | 1/2002 | Harrison et al. |
| 6,341,931 B1 | 1/2002 | Bates |
| 6,354,493 B1 | 3/2002 | Mon |
| 6,359,628 B1 | 3/2002 | Buytaert |
| 6,380,894 B1 | 4/2002 | Boyd et al. |
| 6,409,401 B1 | 6/2002 | Petteruti et al. |
| 6,427,032 B1 | 7/2002 | Irons et al. |
| 6,430,554 B1 | 8/2002 | Rothschild |
| 6,434,561 B1 | 8/2002 | Durst, Jr. et al. |
| 6,442,563 B1 | 8/2002 | Bacon et al. |
| 6,512,919 B2 | 1/2003 | Ogasawara |
| 6,539,281 B2 | 3/2003 | Wan et al. |
| 6,542,933 B1 | 4/2003 | Durst, Jr. et al. |
| 6,600,418 B2 | 7/2003 | Francis et al. |
| 6,651,053 B1 | 11/2003 | Rothschild |
| 6,651,063 B1 | 11/2003 | Vorobiev |
| 6,655,586 B1 | 12/2003 | Back et al. |
| 6,675,165 B1 | 1/2004 | Rothschild |
| 6,707,381 B1 | 3/2004 | Maloney |
| 6,766,363 B1 | 7/2004 | Rothschild |
| 6,801,907 B1 | 10/2004 | Zagami |
| 6,825,753 B2 | 11/2004 | Cardinale et al. |
| 6,860,422 B2 | 3/2005 | Hull et al. |
| 6,865,608 B2 | 3/2005 | Hunter |
| 6,892,376 B2 | 5/2005 | McDonald et al. |
| 6,993,573 B2 | 1/2006 | Hunter |
| 7,006,664 B2 | 2/2006 | Paraskevakos |
| 7,030,760 B1 | 4/2006 | Brown |
| 7,081,818 B2 | 7/2006 | Eckstein et al. |
| 7,129,840 B2 | 10/2006 | Hull et al. |
| 7,323,996 B2 | 1/2008 | Mullins |
| 7,357,300 B2 | 4/2008 | Hull et al. |
| 7,424,974 B2 | 9/2008 | Hull et al. |
| 7,446,661 B2 | 11/2008 | Bhogal et al. |
| 7,446,662 B1 | 11/2008 | Somogyi et al. |
| 7,463,243 B1 | 12/2008 | Kangas et al. |
| 7,471,209 B2 | 12/2008 | Hart |
| 7,506,250 B2 | 3/2009 | Hull et al. |
| 7,609,163 B2 | 10/2009 | Shafer |
| 7,616,113 B2 | 11/2009 | Ayachitula et al. |
| 7,646,336 B2 | 1/2010 | Tan et al. |
| 7,652,555 B2 | 1/2010 | Hull et al. |
| 7,701,334 B1 | 4/2010 | Perkins et al. |
| 7,724,141 B2 | 5/2010 | Reynolds |
| 7,737,850 B2* | 6/2010 | Malik ........................ 340/572.1 |
| 7,884,955 B2 | 2/2011 | Hull et al. |
| 2001/0047381 A1 | 11/2001 | De Meno et al. |
| 2002/0005774 A1 | 1/2002 | Rudolph et al. |
| 2002/0032698 A1 | 3/2002 | Cox |
| 2002/0032707 A1 | 3/2002 | Takeoka |
| 2002/0113707 A1 | 8/2002 | Grunes et al. |
| 2002/0147649 A1 | 10/2002 | White |
| 2002/0176116 A1 | 11/2002 | Rhoads et al. |
| 2003/0018669 A1 | 1/2003 | Kraft |
| 2003/0043073 A1* | 3/2003 | Gray et al. .................... 342/465 |
| 2003/0102970 A1 | 6/2003 | Creel et al. |
| 2003/0179908 A1 | 9/2003 | Mahoney et al. |
| 2003/0191719 A1 | 10/2003 | Ginter et al. |
| 2003/0214388 A1 | 11/2003 | Stuart et al. |
| 2004/0017313 A1 | 1/2004 | Menache |
| 2004/0044956 A1 | 3/2004 | Huang |
| 2004/0079796 A1 | 4/2004 | Hull et al. |
| 2004/0095276 A1 | 5/2004 | Krumm et al. |
| 2004/0181756 A1 | 9/2004 | Berringer et al. |
| 2004/0205455 A1 | 10/2004 | Dathathraya |
| 2004/0257231 A1 | 12/2004 | Grunes et al. |
| 2004/0263388 A1 | 12/2004 | Krumm et al. |
| 2005/0035862 A1 | 2/2005 | Wildman et al. |
| 2007/0052540 A1 | 3/2007 | Hall et al. |
| 2007/0149215 A1 | 6/2007 | Misikangas |
| 2007/0149216 A1 | 6/2007 | Misikangas |
| 2009/0109095 A1 | 4/2009 | Hido et al. |
| 2010/0295943 A1* | 11/2010 | Cha et al. ...................... 348/143 |
| 2011/0050421 A1* | 3/2011 | Duron et al. ............... 340/572.1 |

FOREIGN PATENT DOCUMENTS

| | | |
|---|---|---|
| DE | 19646153 A1 | 5/1998 |
| EP | 794 507 B1 | 5/2004 |
| FR | 2782703 A1 | 3/2000 |
| JP | 08-050598 A | 2/1996 |
| JP | 08-101980 A | 4/1996 |
| JP | 10-013642 A | 1/1998 |
| JP | 10-154229 A | 6/1998 |
| JP | 2001-052054 A | 2/2001 |
| JP | 2002-046821 A | 2/2001 |
| JP | 2001-253517 A | 9/2001 |
| JP | 2002-120475 A | 4/2002 |
| JP | 2002-522999 A | 7/2002 |
| JP | 4256748 B2 | 4/2004 |
| JP | 2002337426 A | 2/2009 |
| WO | WO 00/26856 A2 | 5/2000 |

OTHER PUBLICATIONS

Extended European Search Report for corresponding European Application No. 11180618.8 dated Jan. 13, 2012, 7 pages.

Deyle, et al., "RF Vision: RFID Receive Signal Strength Indicator (RSSI) Images for Sensor Fusion an Mobile Manipulation," Proceedings of 2009 IEEE/RSJ International Conference on Intelligent Robots and Systems (IROS), Oct. 2009, 8 pages.

Rabiner, "A Tutorial on Hidden Markov Models and Selected Applications in Speech Recognition," Proceeding of the IEEE, Feb. 1989, pp. 257-286, vol. 77, No. 2, IEEE.

Web pages from www.thingmagic.com; printed on Nov. 15, 2010, at URL: http://www.thingmagic.com, 5 pages.

Allen, et al., "Workflow: An Introduction," Workflow Handbook, copyright 2001, pp. 15-38.

"Hitachi Announces world's smallest RFID IC, the 'mu-chip'," Jul. 5, 2001, printed on Jan. 21, 2001, at URL: http://www.hitachi.com/about/pressroom/a-2001-Jul-5-ZZZM9WXNSOC.html, 2 pages.

Kwon, "Tiny Bay Area Invention Could Change Security," printed on Jan. 21, 2002, at URL: http://beta.kpix.com/news/local/2001/12/03/Tiny_Bay_Area_Invention_Could_Change_Security . . . , pp. 1-2.

Want, et al., "Bridging Physical and Virtual Worlds with Electronic Tags," CHI '99, May 15-20, 1999, pp. 370-377, ACM.

Want et al., "Expanding the Horizons of Location-Aware Computing," Guest Editor's Introduction, Aug. 2001, pp. 31-34, IEEE.

Want, et al., "Ubiquitous Electronic Tagging," Submitted to IEEE Concurrency, Dec. 1999, pp. 1-6.

"URIs, URLs, and URNs: Clarifications and Recommendations 1.0," Report from the joint W3C/IETF URI Planning Interest Group, W3C Note Sep. 21, 2001, printed on Jun. 9, 2005, at URL http://www.w3.org/TR/uri-clarification/, pp. 1-11.

Web pages from PaperClip.com, printed on Jun. 14, 2006, at URL: http://www.paperclip.com, 10 pages.

"The Workflow Management Coalition Specification—Workflow Management Coalition Workflow Standard—Interoperability Wf-XML Binding," Document No. WFMC-TC-1023, May 1, 2000, version 1.0, 40 pages, The Workflow Management Coalition.

Non-Final Office Action for U.S. Appl. No. 12/980,097 mailed on Jun. 11, 2012, 9 pages.

* cited by examiner

LOCATION OF THE TAG = L0, L1, L2 ...
RECEIVED SIGNAL STRENGTH: S1, S2, S3, ...

OBSERVATION DENSITY IS LEARNED FROM THE TRAINING PHASE:
P(St|Lt = (x1,y1,z1)), P(St|Lt = (x2,y2,z2)), ...

MOTION TRACKING TECHNIQUES FOR RFID TAGS

BACKGROUND

Embodiments of the present invention relate to radio frequency identification (RFID) technology, and more particularly to techniques for tracking the motion of an RFID tag using signal strength information.

RFID technology has seen widespread use in recent times. RFID tags attached to objects are increasingly being used to identify and track the locations of the associated objects. An RFID tag can be read by a reader without requiring a physical contact or direct line of sight to the tag. With advances in RFID technology, the distance over which an RFID tag can be read has also significantly increased over time. While in the past a reader had to be within a couple of inches from an RFID tag to be able to read the tag, tags can now be read over distances of ten meters or more. This has in turn increased the uses or applications of RFID tags.

An RFID tag generally comprises a memory that may be used to stored identification information and/or information related to the object with which the tag is associated. The information stored by an RFID tag may then be read by an RFID reader. There are various types of RFID tags including active tags, passive tags, semi-active tags, and the like. An active tag comprises a power source on the tag (e.g., a battery) and can transmit radio signals autonomously. A passive RFID tag, on the other hand, has no power source on the tag and requires an external source to provoke signal transmission. A passive RFID tag is generally activated upon receiving radio signals from an RFID reader and transmits signals in response to the activation. The signals transmitted by an RFID tag, either active or passive, are read by the RFID reader and may comprise information stored in the memory of the RFID tag.

More recently, in addition to reading information stored by an RFID tag, readers are also capable of determining the received signal strength indicator (RSSI) for signals read from an RFID tag. The RSSI metric measures the signal strength of the radio signal received from an RFID tag (either active or passive). Theoretically, RSSI is directly proportional to the distance of the tag from the reader generating the RSSI metric. However, in real systems, RSSI does not always decrease linearly with increasing distance to the reader. Further, RSSI is also affected by environmental factors such as the presence of objects (e.g., metal objects) that can interfere with signal reception. The RSSI of a single RFID tag may even change every time a reader reads it. As a result, the location of an RFID tag cannot be accurately determined based just upon RSSIs.

BRIEF SUMMARY

Embodiments of the present invention provide techniques for tracking the motion of an RFID tag using signal strength information. In one embodiment, a single antenna of an RFID reader may be used to take a sequence of readings from an RFID tag in motion. A signal strength indicator (also referred to as received signal strength indicator (RSSI)) is determined for each reading. The sequence of RSSIs is then used to estimate a path of motion of the RFID tag and the direction of motion of the RFID tag along the path.

In one embodiment, a single RFID antenna may be used to take a sequence of readings from a radio frequency identification (RFID) tag. A received signal strength indicator (RSSI) may be determined for each reading in the sequence of readings. A sequence of RSSIs is thus determined based upon the sequence of readings. Motion-related information may then be determined for the RFID tag based upon the sequence of RSSIs. The motion-related information may comprise information indicative of a path of motion of the RFID tag and information indicative of a direction of motion of the RFID tag along the path. The RFID antenna may be stationary.

In one embodiment, the motion-related information is determined using reference information, which may be obtained during a training phase. Various different techniques may be used to obtain the reference information. In one embodiment, the reference information may be obtained using Hidden Markov Model (HMM) processing. Reference information obtained using HMM processing may comprise information identifying a plurality of locations and, for each location, an RSSI associated with the location.

In yet another embodiment, K-nearest neighbor analysis may be used to determine the motion-related information. In this embodiment, the reference information may comprise a plurality of vectors, each vector comprising a sequence of RSSIs. Information (e.g., a label) may be associated with each vector comprising information indicative of a path of motion and a direction of motion. Using one technique, a vector from the plurality of vectors may be determined with the smallest Euclidian distance to the sequence of RSSIs corresponding to readings taken from an RFID tag whose motion is to be tracked. The path of motion and direction of motion information associated with the determined vector may then be output as the path of motion and direction of motion of the RFID tag. Using another technique, a set of multiple vectors may be determined from the plurality of vectors with the smallest Euclidian distances to the sequence of RSSIs corresponding to readings taken from the RFID tag. The label associated with most vectors in the set of vectors may then be determined. The path of motion and direction of motion information indicated by the determined label may then be output as the path of motion and direction of motion of the RFID tag.

The RFID tag whose motion is being tracked may be attached to an object. Accordingly, by tracking the motion of the RFID tag, the motion of the object can also be tracked. The path of motion and direction of motion for the object may be determined from the path of motion and direction of motion determined for the RFID tag.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that the invention may be practiced without these specific details.

Embodiments of the present invention provide techniques for tracking the motion of an RFID tag using signal strength information. In one embodiment, a single antenna of an RFID reader may be used to take a sequence of readings from an RFID tag in motion. A signal strength indicator (also referred to as received signal strength indicator (RSSI)) is determined for each reading. The RSSI for a reading indicates the received signal strength for the reading. The sequence of RSSIs is then used to estimate a path of motion of the RFID tag and the direction of motion of the RFID tag along the path.

Figure 1:
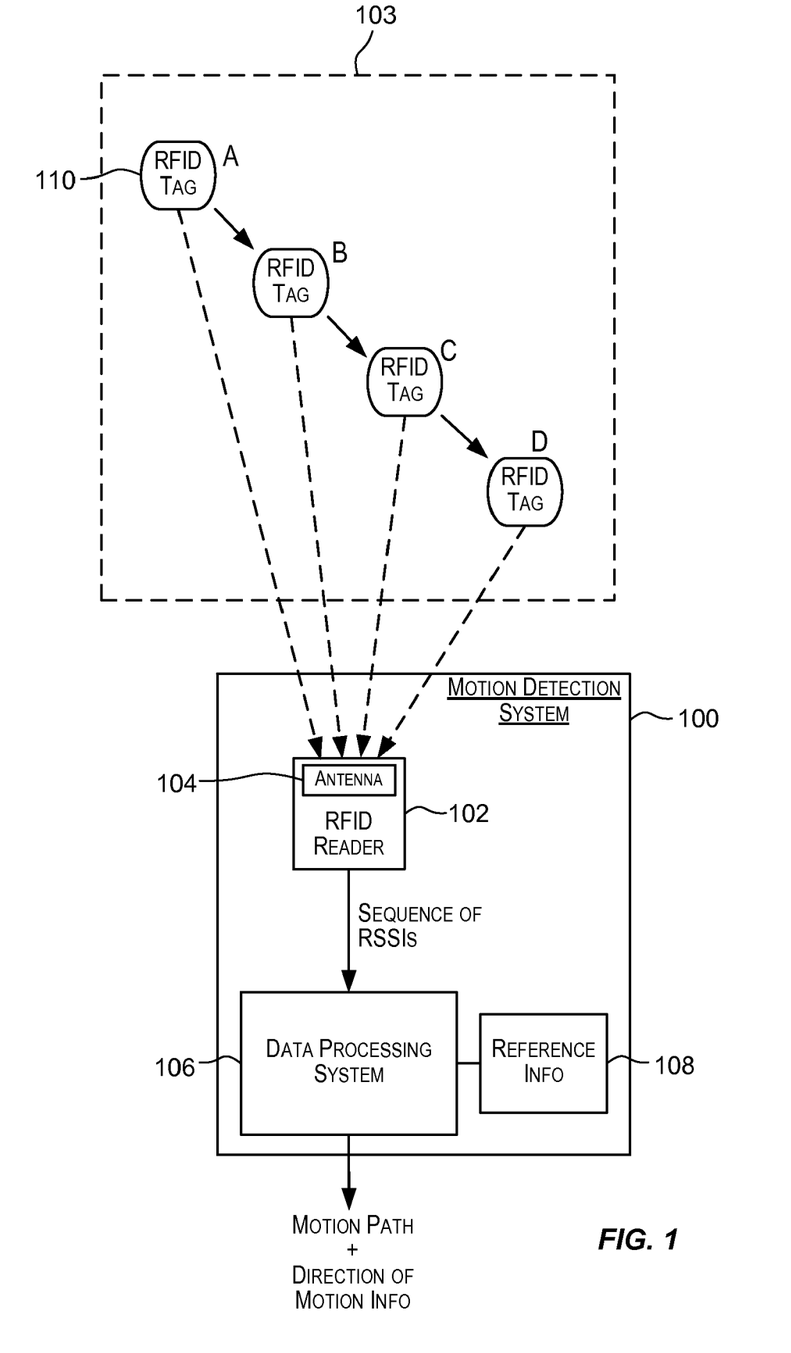
FIG. 1 is a simplified diagram of a motion detection system (MDS) that may incorporate an embodiment of the present invention.

FIG. 1 is a simplified diagram of a motion detection system (MDS) 100 that may incorporate an embodiment of the present invention. As depicted in FIG. 1, MDS 100 comprises an RFID reader 102 and a data processing system 106. RFID reader 102 is configured to take readings from one or more RFID tags. RFID reader 102 comprises a single antenna 104 that is used to receive radio signals read from an RFID tag. In alternative embodiments, tag reader 102 may comprise multiple antennas, one or more of which may be used to track the motion of an RFID tag. However, motion tracking of an RFID tag, as described below, can be accomplished using a single antenna and does not need multiple antennas. In one embodiment, RFID reader 102 and its antenna 104 may be static or stationary. RFID reader 102 has a reception zone 103 (in 2-D or 3-D space) in which reader 102 is capable of receiving radio signals from RFID tags. Reception zone 103 marks an area of space within which reader 102 is capable of reading RFID tags. The range of the reception zone may depend upon various factors such as type of reader and antenna being used, the type of RFID tag being read, and even the environment in which the readings are taken.

RFID reader 102 reads an RFID tag when it receives radio signals from the tag. The tag read by reader 102 may be an active tag or a passive tag. RFID reader 102 reads an active tag by receiving radio signals transmitted by the active tag. An active tag may transmit the radio signals autonomously either in a periodic or random manner. In the case of a passive tag, reader 102 reads the passive tag by sending an interrogation/activation signal to the passive tag and then receiving the response radio signals from the passive tag. In one embodiment, the passive tag sends the response signals using energy derived by the passive tag from the interrogation/activation signal. The signals received by reader 102 from an RFID tag, either active or passive, may encode information stored by the tag. For example, radio signals received from a tag typically encode information (e.g., a tag ID) that uniquely identifies the tag being read. In general, an RFID tag (sometimes referred to as an RFID sensor) may refer to any device that is capable of sending radio signals that can be read by a reader.

RFID reader 102 may be capable of reading one or more RFID tags. While only one RFID tag 110 is shown in FIG. 1, this is not intended to limit the scope of embodiments of the present invention. For example, in one embodiment, reader 102 may be capable of reading 30 RFID tags at a time, or even more. When multiple tags are read, the tag ID associated with each tag and read by reader 102 may be used to uniquely identify the tags that are read. An example of RFID reader 102 is the Mercury5E (M5E) RFID reader provided by ThinkMagic Inc. of Cambridge, Mass., USA. The M5E is an embedded UHF RFID reader that provides support for EPCglobal Gen 2 (ISO 18000-6C) tag protocol with anti-collision, and DRM capabilities. Other RFID readers may also be used.

In order to track the motion of RFID tag 110, reader 102 is configured to take a sequence of readings of tag 110. The readings may be taken while tag 110 is in motion. Depending upon the reader being used, the readings may be taken at different rates. For example, in one embodiment, reader 102 takes readings from tag 110 at the rate of five times per second. RFID tag 110 may be moved in 2-dimensions (2-D) or in 3-dimensions (3-D). In FIG. 1, as an example, RFID tag 110 is moved from location A to location D via locations B and C. Reader 102 may take a sequence of readings of tag 110 in its motion from location A to D. For example, as RFID tag 110 is moved from location A to location D, the sequence of readings taken by reader 102 may include a reading taken at location A, another reading taken at location B, another reading taken at location C, and another reading taken at location D. Each reading preferably includes information uniquely identifying RFID tag 110.

Reader 102 is configured to determine a signal strength for each reading in the sequence of readings taken from tag 110. In one embodiment, the signal strength for each reading may be expressed as a signal strength indicator (RSSI). The RSSI metric (which may be measured in db) for a reading measures the signal strength of the radio signal received by reader 102 from the tag for that reading.

Reader 102 is configured to communicate the readings and their associated RSSIs to data processing system 106 for further processing. In one embodiment, each reading may comprise information (e.g., a tag ID) that uniquely identifies the RFID tag from which the reading is taken. Using the tag ID, the RSSI associated with the reading can be mapped to a particular RFID tag. The information may be communicated from reader 102 to data processing system 106 via a wired or wireless link, or combinations thereof.

Data processing system 106 is configured to performing processing to track the motion of the RFID tag based upon the sequence of RSSIs received from reader 102. Data processing system 106 is configured to determine motion-related information for the RFID tag, the motion-related information including an estimation of the path of motion of the RFID tag and the direction of motion along the path. In one embodiment, data processing system 106 generates a sequence of signal strength values based upon the signal strength values received from reader 102. Data processing system 106 then determines the motion-related information for an RFID tag based upon the sequence of RSSIs and based upon reference information 108 that is accessible to data processing system 106.

Reference information 108 stores information that is used to estimate the motion-related information for an RFID tag. Various different models may be used to estimate the direction of motion. Examples include Hidden Markov Model (HMM), a nearest neighbor classification model, and others.

The contents of reference information 108 depend upon the particular model that is used for the motion estimation. Reference information 108 may be stored on a non-volatile memory medium that is accessible (or is made accessible) to data processing system 106 during the processing or may even be a part of data processing system 106.

The motion-related information, including information estimating the path of motion of the RFID tag and the direction of motion along the path, determined by data processing system 106 may then be output. Various different output modes may be used to output the motion-related information. For example, the motion-related information may be displayed on a screen, output as audio information via an audio output device, printed on a paper medium, and the like, or combinations thereof.

Figure 2A:
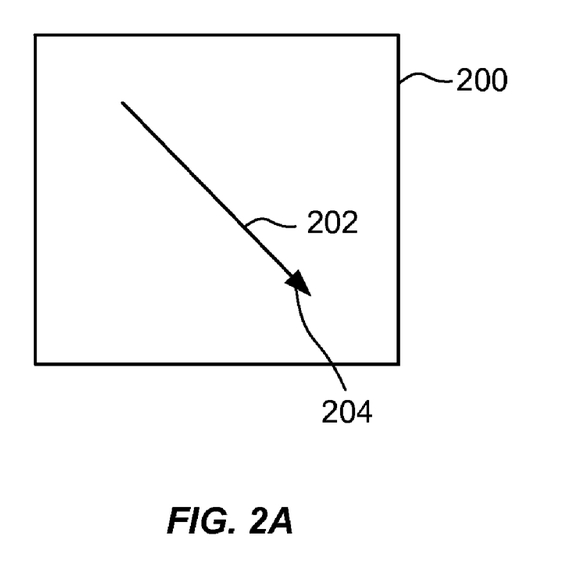
FIGS. 2A and 2B depict examples of motion-related information according to an embodiment of the present invention.

Further, the motion-related information may be expressed using different techniques. For example, in one embodiment, graphics may be used to convey the path of motion and the direction of motion along the path. For example, for the motion of RFID tag 110 from location A to location D in FIG. 1, an arrow 202 may be displayed on a screen 200 indicating the path and the direction of motion as depicted in FIG. 2A. In FIG. 2A, the direction of motion is shown by arrowhead 204. The motion-related information could also be expressed using a textual description. For example, for the motion of tag 110 in FIG. 1, the textual description may state:

"Tag 110 is moved in a straight line in a direction from the north-west (NW) to the south-east (SE)"

In yet another embodiment, the motion-related information may be expressed using spatial coordinates such as (x,y) (for 2-D motion) or (x,y,z) (for 3-D motion). The motion-related information may also be expressed using other techniques. In one embodiment, both the output mode and the technique used for expressing the motion-related information are user configurable/selectable.

The motion-related information may be subjected to further analysis to determine additional information related to the tag's motion. For example, the motion-related information may be used to determine whether or not a tag has left a particular area or zone (e.g., whether the tag has left a room). As another example, the motion-related information may be used to determine the motion of the tag relative to another object such as whether the tag is moving towards or away from the object. This additional information may be included as part of the motion-related information that is output.

Figure 2B:
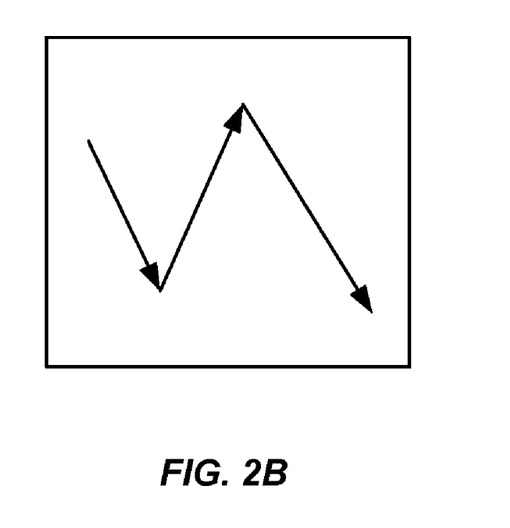

The path of motion depicted in FIG. 2A is along a straight line and the direction of motion is in one direction. More complex motion patterns may be tracked in alternative embodiments. For example, as depicted in FIG. 2B, the path of motion may include multiple subpaths, with a direction of motion being determined for each subpath As described above, MDS 100 is configured to determine motion-related information for an RFID tag, including path of motion and direction of motion information, based upon a sequence of radio signal readings taken by an RFID reader from the RFID tag and based upon a sequence of RSSIs determined for the readings. It is to be noted that the motion-related information for an RFID tag can be determined solely based upon readings taken by a single antenna of an RFID reader. The reader and the antenna may be static or stationary.

MDS 100 depicted in FIG. 1 is merely an example of an embodiment incorporating the teachings of the present invention and is not intended to limit the scope of the invention as recited in the claims. Various other configurations are possible in other embodiments. For example, in one embodiment, reader 102 may be a part of data processing system 106.

In another embodiment, data processing system 106 may be distributed between multiple systems.

Figure 3:
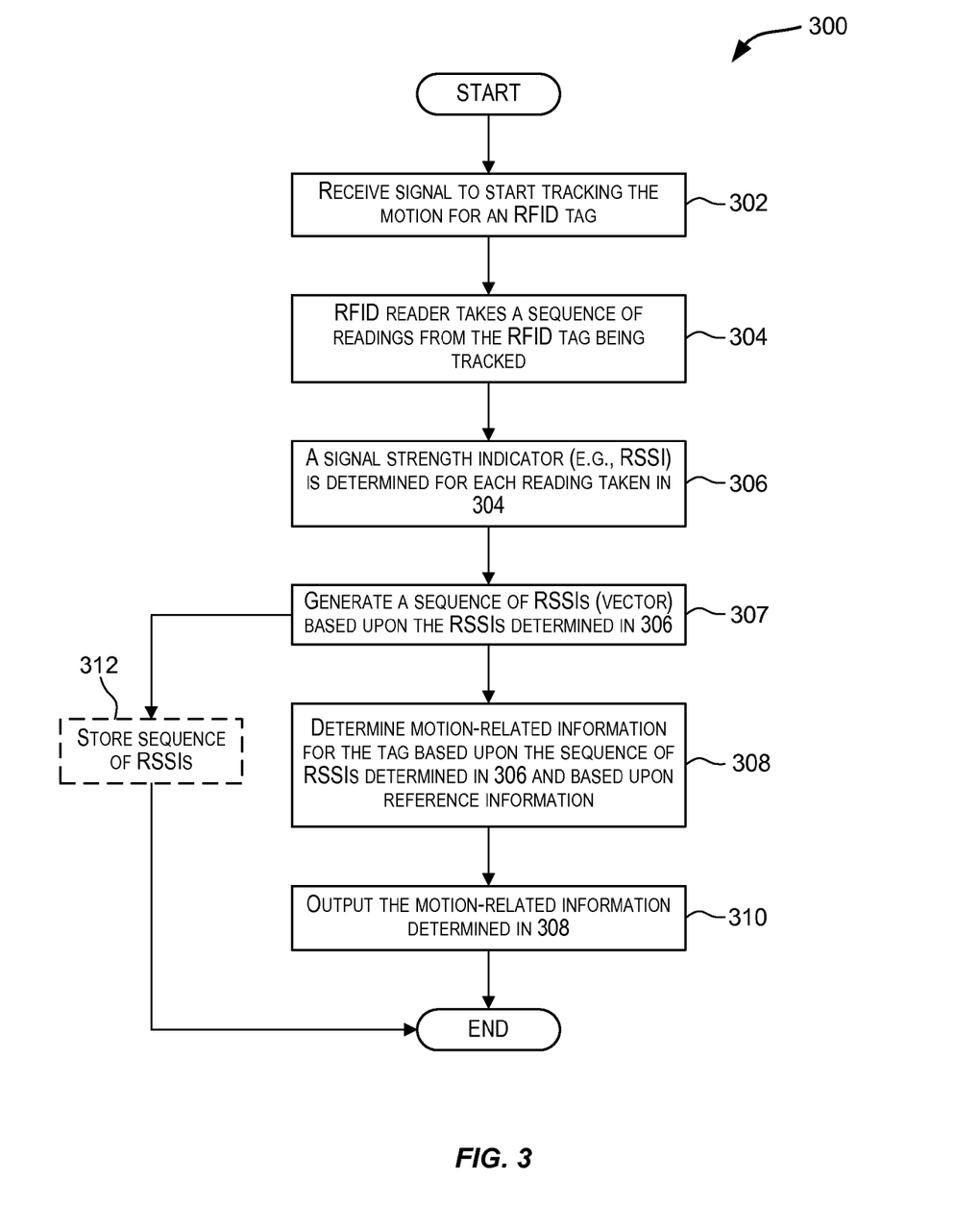
FIG. 3 depicts a simplified flowchart describing a high-level method for determining motion-related information for an RFID tag according to an embodiment of the present invention.

FIG. 3 depicts a simplified flowchart 300 describing a high-level method for determining motion-related information for an RFID tag according to an embodiment of the present invention. The processing depicted in FIG. 3 may be performed by software (e.g., program, code, instructions) executed by a processor (e.g., by a processor of data processing system 106 depicted in FIG. 1), by hardware, or combinations thereof. The software may be stored on a non-transitory computer readable storage medium. The particular sequence of processing steps depicted in FIG. 3 is not intended to limit the scope of embodiments of the present invention as recited in the claims.

As depicted in FIG. 3, processing may be initiated upon receiving a signal to start tracking the motion of an RFID tag (step 302). The information received in 302 may comprise information identifying a specific RFID tag whose direction of motion is to be tracked. The specific RFID tag may be identified, for example, using the tag's identification information (e.g., tag ID). This is useful in an environment where there may be multiple RFID tags that can be read by the RFID reader.

Various different conditions may trigger the signal received in 302. In one embodiment, the signal may be triggered in response to a request from a user to start tracking the motion of an RFID tag. For example, the user may issue an instruction to MDS 100 in FIG. 1 to track the motion of an RFID tag. In another embodiment, the signal in 302 may be automatically generated upon detecting that the RFID tag is in motion. For example, the signal may be generated upon detecting that a previously stationary RFID tag is now in motion.

A sequence of readings is then taken by the RFID reader from the RFID tag being tracked (step 304). As previously described, the RFID tag may be an active tag or a passive tag. For example, as RFID tag 110 in FIG. 1 is moved from point A to point D via points B and C, the sequence of readings taken from the RFID tag may include readings taken at locations A, B, C, and D.

A signal strength indicator (e.g., RSSI) is then determined for each reading taken in 304 (step 306). For example, for movement of RFID tag 110 from point A to point D in FIG. 1, an RSSI may be determined for each of the readings taken at locations A, B, C, and D. A sequence of signal strengths is then determined based upon the signal strengths determined in 306 (step 307). In one embodiment, the sequence is generated based upon a time line of the readings corresponding to the signal strengths. For example, for movement of RFID tag 110 from A to D in FIG. 1, the following sequence of RSSIs may be generated: RSSI(A), RSSI(B), RSSI(C), and RSSI (D). A vector V may be constructed based upon the RSSIs determined along a time line as $$V=\{RSSI(A), RSSI(B), RSSI(C), RSSI(D)\}.$$

Motion-related information for the tag is then determined based upon the sequence of RSSIs determined in 306 and based upon reference information (step 308). The motion-related information includes information indicating the path of motion of the RFID tag and also information indicating the direction of motion of the RFID tag along the determined path. For example, the vector V determined for the motion of RFID tag 110 from point A to point D may be used along with the reference information to estimate a path of motion of tag 110 and the direction of motion along the path.

The motion-related information determined in 308 may then be output (step 310). As previously described, different output modes may be used to represent the direction of motion. Further, the direction of motion may be expressed using various different techniques.

In one embodiment, information related to the sequence of RSSIs determined in 307 may be stored for later analysis (step 312). For each RSSI, the stored information may also include timing information indicative of the time of the reading corresponding to the RSSI. This stored information enables motion-related information to be determined for motion that has occurred in the past. For example, a user may send a request to MDS 100 to determine the path and direction of motion for an RFID tag for a period of time in the past. MDS 100 may then access the stored information, and based upon the stored sequence of RSSIs corresponding to the specified past period of time, determine the path of motion and the direction of motion of the RFID tag along the path. In this manner, motion-related analysis may be performed for motion that has occurred in the past.

As described above, in 304, reader 102 takes a sequence of tag readings along a time line. The time period for which the readings are taken may depend upon the mode of operation of MDS 100. In one embodiment, MDS 100 may be configured to track the direction of motion of an RFID tag between two stationary positions of the tag. In this embodiment, MDS 100 may be configured to start direction of motion tracking of a tag when the previously stationary tag is detected to be in motion and to stop the direction of motion tracking when the tag is again stationary. In this embodiment, the direction of motion of the tag is tracked from a starting stationary position to an end stationary position. For example, in FIG. 1, RFID tag 110 may be moved from location A to location D with location A being the start stationary location and location D being the end stationary location and direction of motion is tracked between these two stationary positions. However, it is not required that the start and/or end positions be stationary for MDS 100 to track direction of motion for a tag.

In one embodiment, the tracking of direction of motion of an RFID tag may be started when MDS 100 receives an instruction to start direction of motion monitoring and the direction of motion tracking may be ended upon receiving another instruction to stop the tracking In another embodiment, MDS 100 may be configured to start tracking direction of motion of a tag upon receiving an instruction to start the tracking and may be configured to continue the tracking for a fixed period of time after the start time. This period of time may be user configurable. In yet another embodiment, the start and end times for the direction of motion tracking may be provided to MDS 100 and MDS 100 may be configured to perform the direction of motion tracking between the start and end times.

Figure 4:
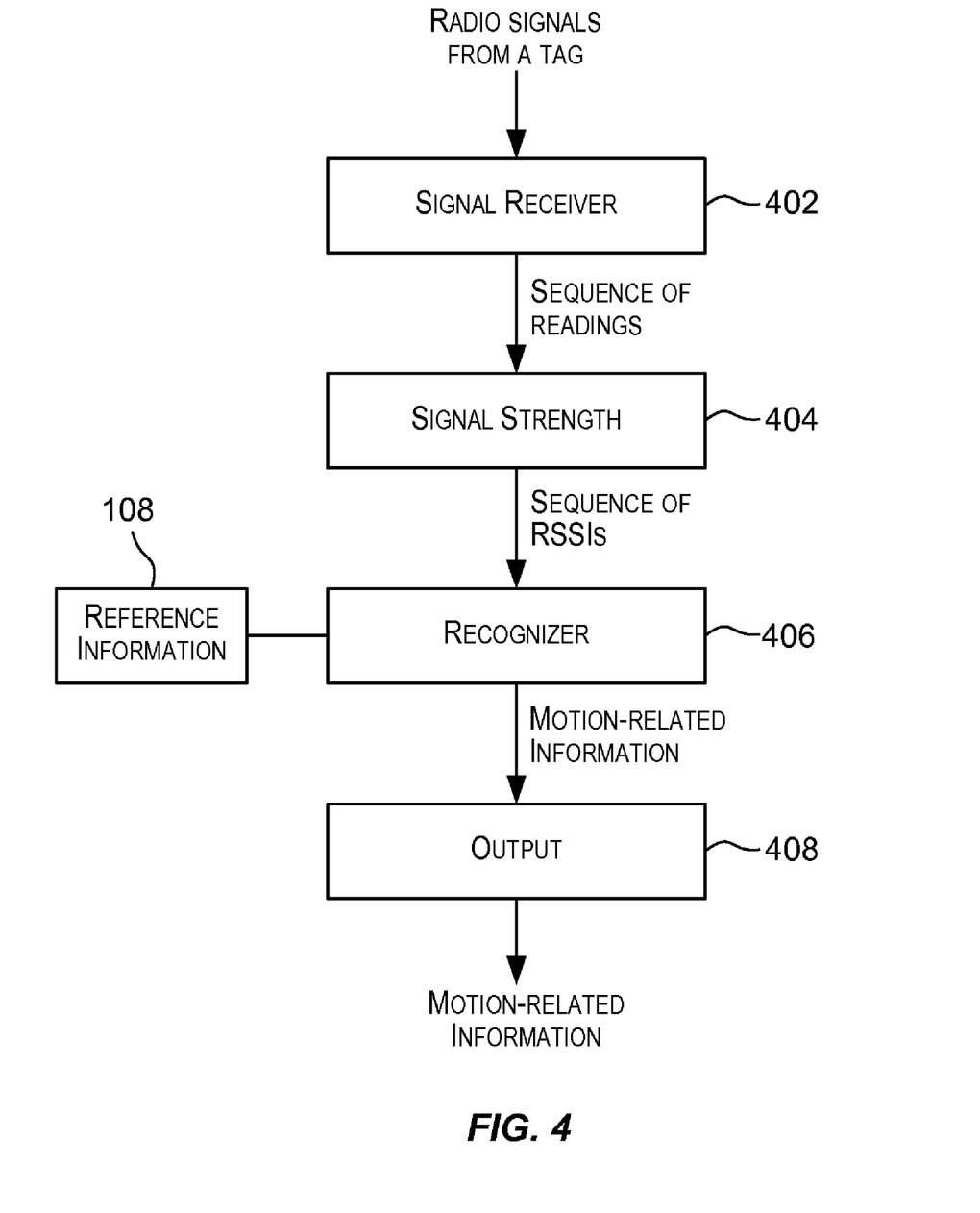
FIG. 4 is a simplified block diagram of modules that may be used to implement an embodiment of the present invention.

FIG. 4 is a simplified block diagram of modules that may be used to implement an embodiment of the present invention. In the embodiment depicted in FIG. 4, the modules include a signal receiver module 402, a signal strength module 404, a recognizer module 406, and an output module 408. The modules depicted in FIG. 4 may be implemented in software (that is executed by one or more processors), hardware, of combinations thereof. The modules depicted in FIG. 4 are not intended to be limiting. Other modules or combinations thereof may also be provided in alternative embodiments.

Signal receiver module 402 is configured to take a sequence of readings from an RFID tag whose motion is being tracked in motion. Signal receiver module 402 may communicate the readings to signal strength module 404. Signal strength module 404 is configured to determine the signal strength (e.g. RSSI) for each reading received from signal receiver module 402. Signal strength module 404 is configured to form a vector of signal strengths (e.g., a vector of RSSIs) based upon the times when the tag readings corresponding to the RSSIs were taken. For example, a vector such as V={RSSI(A), RSSI(B), RSSI(C), RSSI(D)} may be generated for readings taken when RFID tag 110 in FIG. 1 is moved from point A to point D. Signal strength module 404 may then communicate the vector of signal strengths to recognizer module 406 for further analysis. In one embodiment, signal receiver module 402 and signal strength module 404 may be implemented as part of reader 102 depicted in FIG. 1.

Recognizer 406 is configured to determine motion-related information for the tag being tracked based upon the vector of signal strengths received from signal strength module 404. Recognizer 406 is configured to use reference information 108 to estimate the motion-related information based upon the vector of RSSIs. Various different techniques/models may be used to implement recognizer 406, as described below in more detail. The motion-related information, including information indicative of the path of motion and the direction of motion along the path, may then be forwarded to output module 408.

Output module 408 is configured to output the motion-related information received from classifier 406. The information may be output using different output modes such as displaying the information on a screen, outputting the information via an audio output device, printing the information on a paper medium, and the like, or combinations thereof. Further, the information itself may be expressed using different techniques.

Various different models or techniques may be used to estimate the RFID tag motion. Each model typically comprises a training phase during which reference information 108 for that model is built and a recognition phase during which the reference information determined during the training phase is used to estimate the motion-related information of an RFID tag based upon a vector of signal strengths determined for readings taken from the tag in motion. Examples of models that may be used include a Hidden Markov Model (HMM), a nearest neighbor classification model, and others.

Hidden Markov Model

In one embodiment, a Hidden Markov Model (HMM) is used to model the reference information that is used to estimate the path of motion and direction of motion of an RFID tag. In the HMM embodiment, recognizer 406 is implemented as an HMM decoder. The vector of signal strengths generated by signal strength module 404 is sent to the HMM decoder for estimation of the motion-related information for the RFID tag. In one embodiment, the HMM decoder uses a Viterbi algorithm to determine the motion-related information.

Figure 5:
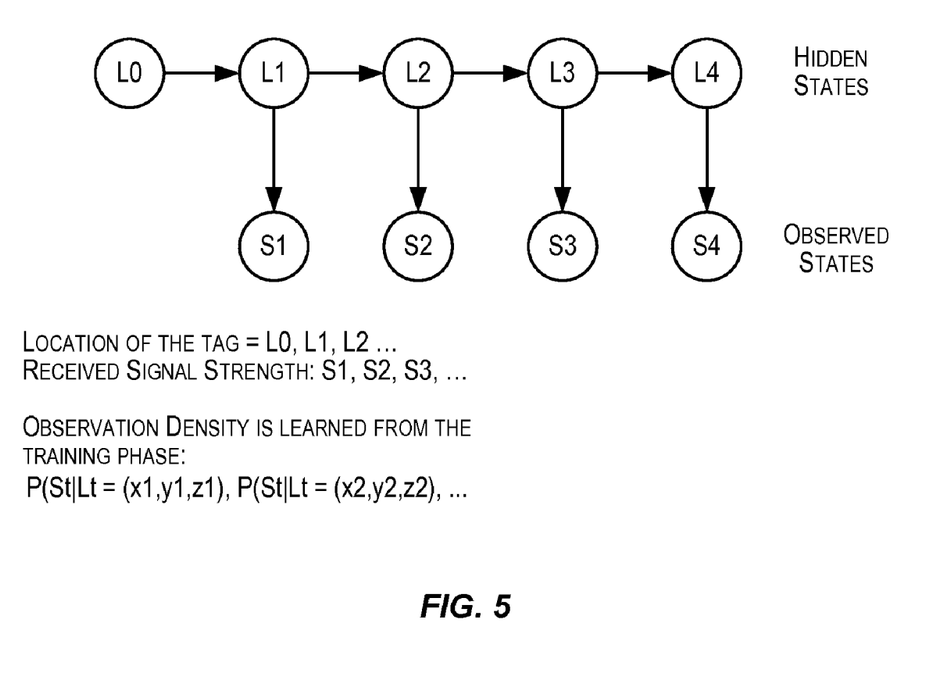
FIG. 5 depicts a Markov chain of hidden and observed states that may be used to implement an embodiment of the present invention.

Using HMM, the hidden Markov chain comprises a sequence of hidden states ($L_n$) and their associated observed states ($S_n$) as shown in FIG. 5. The hidden states of the HMM are the actual locations of the RFID tag (in either 2-D or 3-D). The observed states are the received signal strength indicators (RSSIs) at the various locations. The RSSIs are available for both the training phase and the recognition phase. Accordingly, the observed event is the signal strength determined for a signal read from an RFID tag at a location (X) at a particular time (T), i.e., the observed event is RSSI(X) at time T. The hidden event is the location (X) of the RFID tag at time T. During the training phase, the hidden and observed events are aligned on the time line, for every observed RSSI there is a location X. The hidden state at time T only depends on the observed event at time T and the most likely hidden sequence at time T-1. This is based on the assumption that the signal strength distribution is a Markov random field. The signal strength at one point is only dependent on the signal strength of neighboring points.

During the training phase using HMM, the goal is to form correlations or mappings between various locations within the reception zone of a reader and RSSIs determined for readings taken by the RFID reader at those locations. A camera coupled with the RFID reader may be used during the training phase to capture the locations (in 2-D (x,y), or in 3-D (x,y,z)) of the tag within the reception zone while the RFID reader records RSSIs for readings taken from the tag at those locations. The locations (hidden states) have a one-to-one mapping to the sequence of RSSIs (observed states).

Figure 6:
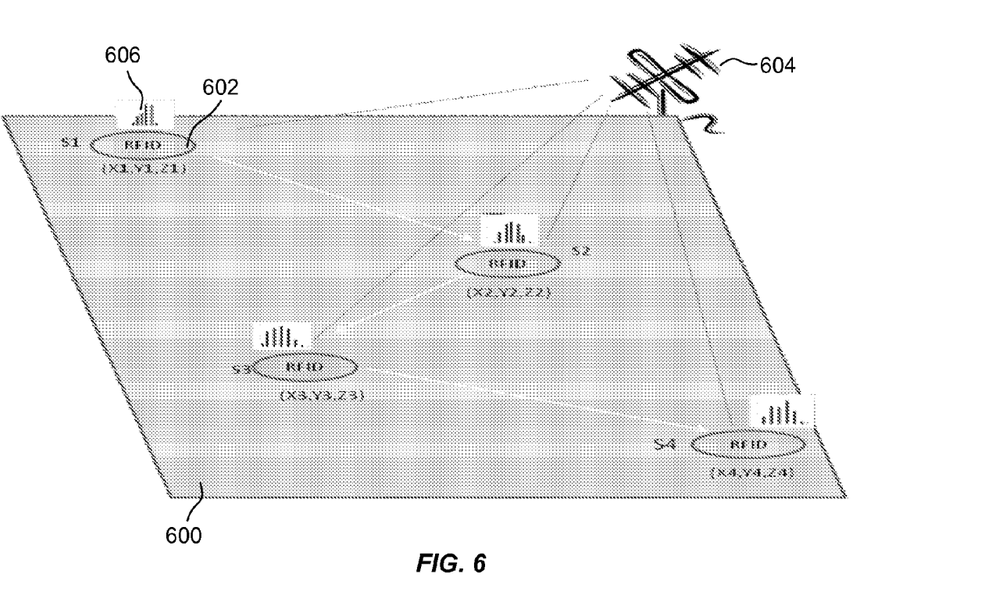
FIG. 6 depicts an example of information that is captured during the training phase of an embodiment of the present invention using a Hidden Markov Model (HMM)

During the training phase, the RFID tag may pass over multiple locations within the reception zone of the reader and further may pass over a location multiple times. Each time the tag passes over a location, the RSSI is recorded for the corresponding tag reading. Accordingly, multiple RSSIs may be determined for a location during the training phase. The multiple RSSIs determined for a location may vary every time but within a certain range. For example, as shown in FIG. 6, during the training phase, a tag 602 may pass multiple times over locations S1, S2, S3, and S4 within the reception zone 600 of RFID reader 604. Accordingly, each location may have multiple RSSIs associated with it. In one embodiment, these values may be represented by a histogram. For example, as depicted in FIG. 6, each of locations S1, S2, S3, and S4 has a histogram 606 of RSSIs associated with it.

An observation density is then computed using this mapping between locations and their associated histograms. For example, for location $L_1 = (X_1, Y_1, Z_1)$, $$P(S_t = 40 | L_t = (X_1, Y_1, Z_1)) = 0.1 \quad (A)$$

The above equation describes the Probability Density Function of RSSI at time t at location $(X_1, Y_1, Z_1)$. This Probability Density Function is also illustrated as histograms in FIG. 6. At a given time, at a given location, the observed RSSI can only have so many values and the probability of all these different values sums to 1. This Probability Density Function is learned as the tag passes by the same location many times during the training phase.

$$P(S_t = 50 | L_t = (X_1, Y_1, Z_1)) = 0.3 \quad (B)$$

$$P(S_t = 60 | L_t = (X_1, Y_1, Z_1)) = 0.4 \quad (C)$$

$$P(S_t = 70 | L_t = (X_1, Y_1, Z_1)) = 0.2 \quad (D)$$

where as $\sum_{k=0}^{max} P(S_t = k | L_t = (X_1, Y_1, Z_1)) = 1$

Accordingly, after the training phase, the observation density for the locations that were traversed during the training phase is obtained.

As indicated above, during the training phase, a tag may pass through the same location multiple times. For example, if the tag passes through location $(X_1, Y_1, Z_1)$ 100 times, then the equations above indicate that, of these 100 times, 10 times the RSSI is 40, 30 times the RSSI is 50, 40 times the RSSI is 60, and 20 times the RSSI is 70.

Now the motion estimation during the recognition phase becomes an optimization problem. Using Viterbi decoding for a hidden Markov chain, $$\hat{L} = \operatorname*{argmax}_{L} P(L_0, L_1 \ldots L_T | S_1, S_2 \ldots S_T) \quad (1)$$

which can be solved by iterative Viterbi decoding:

$$\gamma_t(L_t) = \max_{L_1, L_2 \ldots L_t} P(L_0, L_1 \ldots L_t | S_1, S_2 \ldots S_t) \propto \quad (2)$$

$$P(S_t | L_t) \max_{L_{t-1}} P(L_t | L_{t-1}) \gamma_{t-1}(L_{t-1})$$

After Viterbi decoding, the maximum likelihood path of the hidden Markov chain is the estimated motion. The algorithm maximizes the conditional probability of location ($L_0$, $L_1$, ..., $L_t$) based on the observed RSSI ($S_1, S_2, \ldots, S_t$). The Markov property guarantees the location at time t is only related to location at time t−1. So the maximization can be solved using a dynamic programming algorithm equation (2), i.e., the Viterbi decoding. The part of Viterbi decoding $P(S_t|L_t)$ is the Probability Density Function described by equations (A), (B), (C), and (D) above that are learned at the training phase.

RFID Tag Motion Classification using Nearest Neighbor or K-Nearest Neighbor

Figure 7:
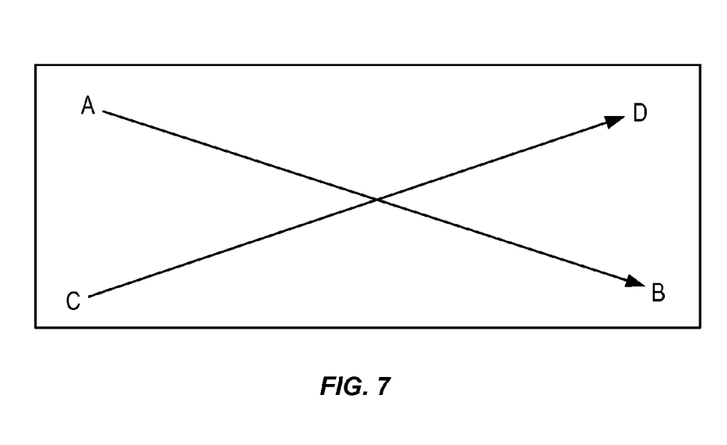
FIG. 7 depicts examples of motions that may be used during the training phase of an embodiment of the present invention using a K-nearest neighbor classification technique.
Figure 8A:
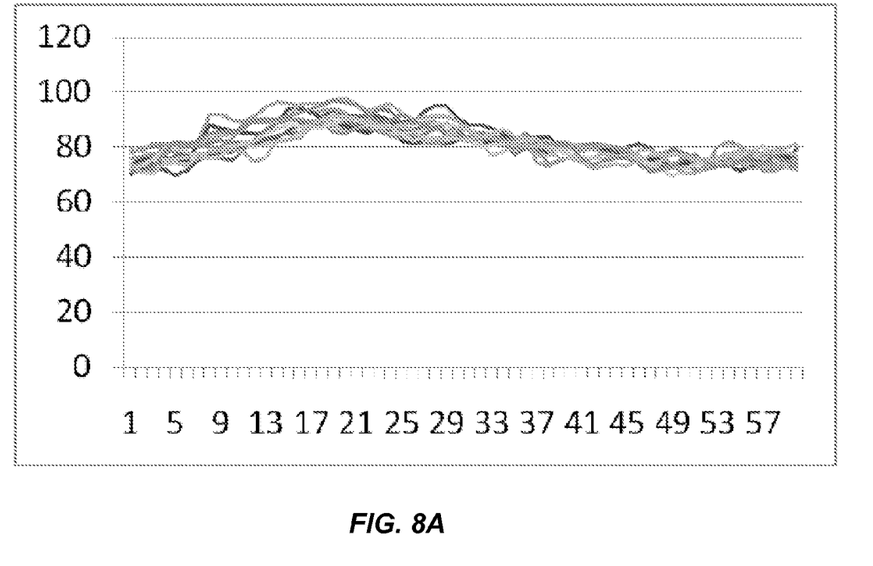
FIGS. 8A and 8B depict an example of information that is captured during the training phase of an embodiment of the present invention using a K-nearest neighbor classification technique.
Figure 8B:
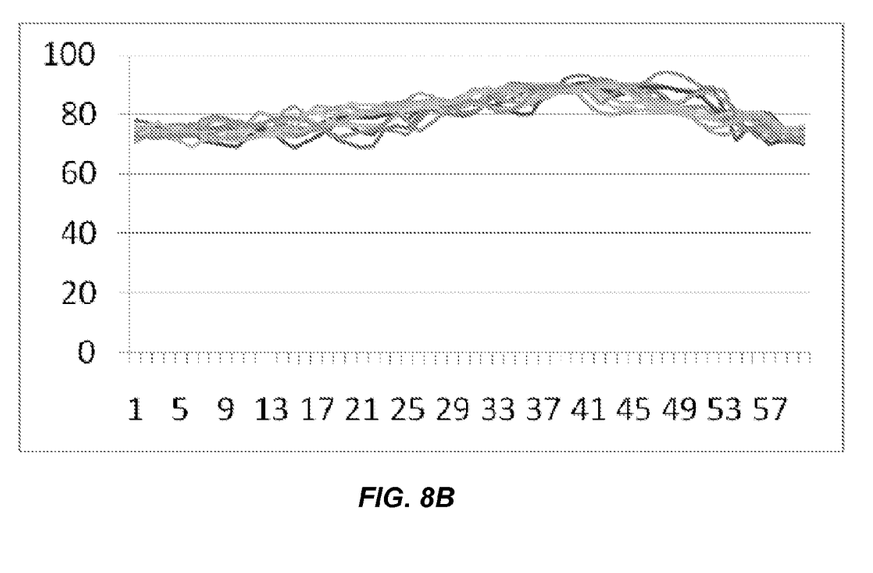

Nearest neighbor classification does not distinguish states within the motion. In this embodiment, recognizer 406 may be implemented as a nearest neighbor classifier. The RSSI sequence generated is treated entirely as a vector input to the classifier. During the training phase, the goal is to obtain for multiple motion paths within the reception zone, each with a particular direction of motion, multiple vectors of RSSIs. Accordingly, during the training phase, a motion from one location to another location within the reception zone is repeated multiple times and the generated RSSI sequences are stored as reference information in a database. FIG. 7 depicts two such motions that may be used during the training phase: moving an RFID tag from A to B and moving the RFID tag from C to D. Each motion depicted in FIG. 7 may pass through different actual paths and generate different RSSI sequences for each path. FIG. 8A depicts examples of such RSSI sequences obtained for the motion from A to B. In FIG. 8A (and in FIG. 8B), the X-axis represents the time line and the Y-axis represents the observed RSSI values. The multiple series or sequences of RSSIs shown in FIG. 8A (each graphed curve in FIG. 8A represents a series of RSSIs) are recorded with one motion repeated many times. The recorded RSSIs may be different each time, but the curves in the 60-dimensional space are close to each other. The RSSI vectors (each vector comprising a sequence of RSSIs) are stored as reference information, with each vector being labeled as A→B. Similarly, FIG. 8B depicts examples of RSSI sequences (each graphed curve in FIG. 8B represents a series of RSSIs) obtained for the motion from C to D. The RSSI vectors (each vector comprising a sequence of RSSIs) are stored as reference information, with each vector being labeled as C→D. It is to be noted that the direction of motion affects the vector of RSSIs that are generated. Accordingly, vectors generated as a result of motion from A to B may be different from the vectors generated for motion from B to A. As a result, the directionality of the motion affects the generated sequence of RSSIs. In this manner, as a result of the training phase, multiple vectors of RSSIs are stored as reference information, with each vector associated with a label indicative of the path of motion and the direction of motion that generated that vector.

At the recognition phase, the vector representing a sequence of RSSIs obtained from readings from the RFID tag being tracked is compared against the vectors of RSSI sequences stored in the reference information. In one embodiment, from the stored vectors, a vector with the smallest Euclidian distance to the vector corresponding to the RFID tag being tracked is found. The label associated with the found vector provides the path of motion and the direction of motion for the RFID tag being tracked.

In an embodiment using the K-nearest neighbor (K-NN) algorithm, the first K stored RSSI sequences with the smallest Euclidian distances to the input vector of RSSIs are found from the reference information. The label that is associated most among these K vectors is the result of recognition and denotes the path of motion and the direction of motion of the RFID tag.

The Nearest Neighbor and K-Nearest Neighbor classification can recognize any type of motion as long as it has been labeled in the training phase. NN and K-NN techniques are robust against path variation since multiple paths are all collected in the training phase. However, these techniques can only recognize motions that are labeled in the training phase. In comparison, embodiments using HMM decoding are able to determine motion-related information along paths and directions not known before. Embodiments using HMM are less robust against path variations.

As described above, MDS 100 comprising a single reader with a single antenna is able to determine the path of motion and the direction of motion of an RFID tag along the path based upon signal strength information determined for readings taken by an RFID reader from the RFID tag. In real-life applications, an RFID tag is typically associated or attached to an object. As the object is moved, the RFID tag moves along with the object. In such an embodiment, tracking the path and direction of motion of an RFID tag amounts to tracking the path of motion and direction of motion of the object itself. Accordingly, the path of motion of the object and the direction of motion of the object along the path can be tracked based upon signal strength sequences recorded for readings from the RFID tag attached to the object.

Figure 9:
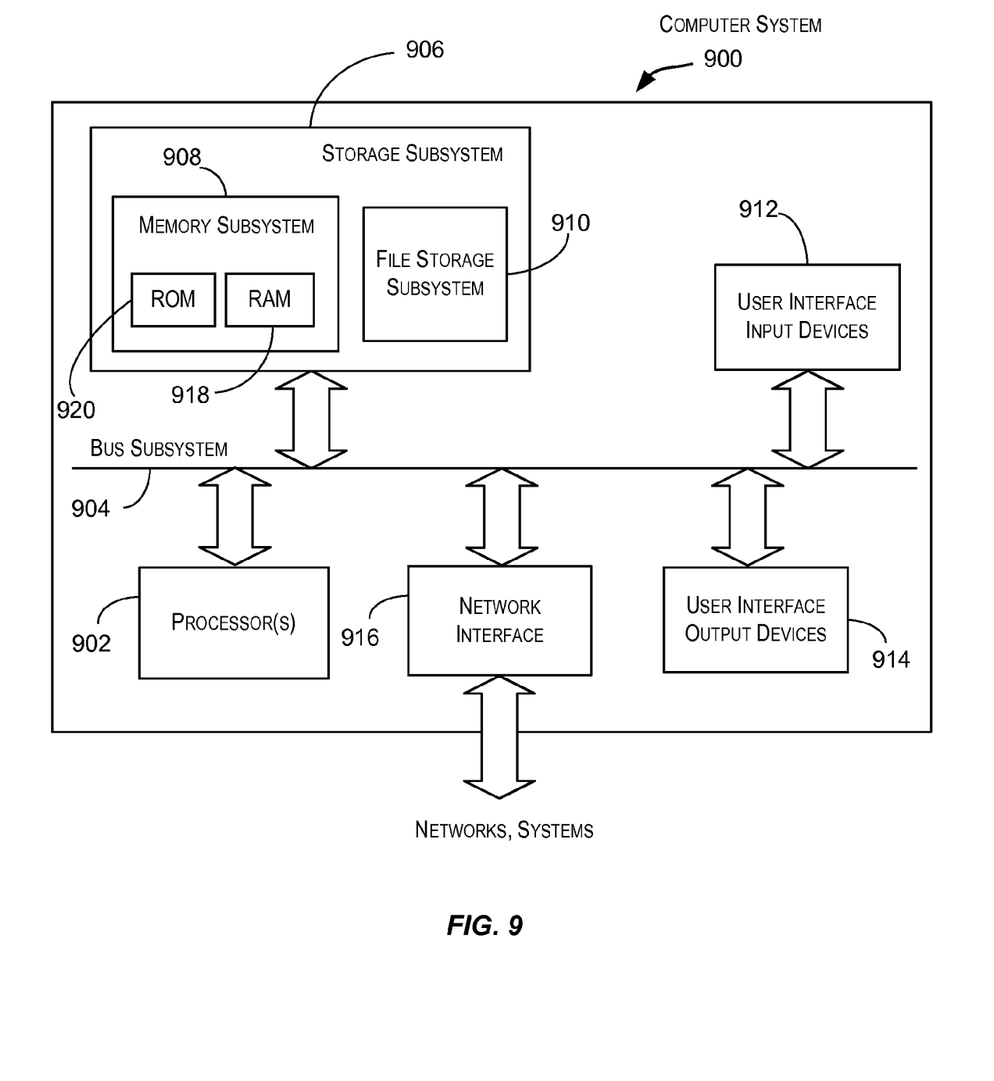
FIG. 9 is a simplified block diagram of a computer system that may be used to practice an embodiment of the present invention.

FIG. 9 is a simplified block diagram of a computer system 900 that may be used to practice an embodiment of the present invention. In various embodiments, computer system 900 may be used to implement data processing system 106 illustrated in FIG. 1 and described above. As shown in FIG. 9, computer system 900 includes a processor 902 that communicates with a number of peripheral subsystems via a bus subsystem 904. These peripheral subsystems may include a storage subsystem 906, comprising a memory subsystem 908 and a file storage subsystem 910, user interface input devices 912, user interface output devices 914, and a network interface subsystem 916.

Bus subsystem 904 provides a mechanism for enabling the various components and subsystems of computer system 900 to communicate with each other as intended. Although bus subsystem 904 is shown schematically as a single bus, alternative embodiments of the bus subsystem may utilize multiple busses.

Network interface subsystem 916 provides an interface to other computer systems and networks. Network interface subsystem 916 serves as an interface for receiving data from and transmitting data to other systems from computer system 900. For example, network interface subsystem 916 may enable a user computer to connect to the Internet and facilitate communication of RFID tag motion-related information using the Internet.

User interface input devices 912 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 900. A user may use a user interface input device to control the tracking of RFID tags. For example, instructions related to initiating/ending the tracking of an RFID tag may be provided using a user interface input device.

User interface output devices 914 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 900. Motion-related information for an RFID tag being tracked may be output using a user interface output device.

Storage subsystem 906 provides a computer-readable storage medium for storing the basic programming and data constructs that provide the functionality of the present invention. Software (programs, code modules, instructions) that when executed by a processor provide the functionality of the present invention may be stored in storage subsystem 906. These software modules or instructions may be executed by processor(s) 902. Storage subsystem 906 may also provide a repository for storing data used in accordance with the present invention such as reference information 108. Storage subsystem 906 may comprise memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions are stored. File storage subsystem 910 provides a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 900 can be of various types including a personal computer, a phone, a portable computer, a workstation, a network computer, a mainframe, a kiosk, a server or any other data processing system. Due to the ever-changing nature of computers and networks, the description of computer system 900 depicted in FIG. 9 is intended only as a specific example for purposes of illustrating the preferred embodiment of the computer system. Many other configurations having more or fewer components than the system depicted in FIG. 9 are possible.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular sequence of transactions and steps, this is not intended to limit the scope of inventive embodiments.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

What claimed is:

1. A method comprising:
receiving a sequence of readings from a radio frequency identification (RFID) tag;
determining a received signal strength indicator (RSSI) for each reading in the sequence of readings;
generating a first sequence of RSSIs based upon the RSSIs determined for the sequence of readings; and
determining motion-related information for the RFID tag based upon the first sequence of RSSIs and reference information, the motion-related information comprising information indicative of a path of motion of the RFID tag and information indicative of a direction of motion of the RFID tag along the path, the reference information comprising a plurality of RSSI vectors, each vector comprising a sequence of RSSIs and being associated with information indicative of a path of motion and a direction of motion;
wherein determining the motion-related information comprises:
determining, from the plurality of RSSI vectors, a RSSI vector having a smallest Euclidian distance to the first sequence of RSSIs; and
outputting a path of motion and a direction of motion associated with the determined RSSI vector as the path of motion and the direction of motion of the RFID tag.

2. The method of claim 1 wherein the reference information comprises information obtained using Hidden Markov Model (HMM) processing, the reference information comprising information identifying a plurality of locations and, for each location, an RSSI associated with the location.

3. The method of claim 1 wherein the RFID tag is attached to an object, the method further comprising determining a path of motion and a direction of motion for the object based upon the path of motion and the direction of motion determined for the RFID tag.

4. A system comprising:
a reader comprising an antenna; and
a data processing system communicatively coupled with the reader;
wherein the reader is configured to:
take, using the antenna, a sequence of readings from an radio frequency identification (RFID) tag; and
determine a received signal strength indicator (RSSI) for each reading in the sequence of readings;
wherein the data processing system is configured to:
generate a sequence of RSSIs based upon the RSSIs determined for the sequence of readings; and
determine motion-related information for the RFID tag based upon the sequence of RSSIs and reference information, the motion-related information comprising information indicative of a path of motion of the RFID tag and information indicative of a direction of motion of the RFID tag along the path, the reference information comprising a plurality of RSSI vectors, each vector comprising a sequence of RSSIs and being associated with information indicative of a path of motion and a direction of motion;
wherein to determine the motion-related information, the data processing system is further configured to:
determine, from the plurality of RSSI vectors, a RSSI vector having a smallest Euclidian distance to the first sequence of RSSI; and
output a path of motion and a direction of motion associated with the determined RSSI vector as the path of motion and the direction of motion of the RFID tag.

5. The system of claim 4 wherein the reference information comprises information obtained using Hidden Markov Model (HMM) processing, the reference information comprising information identifying a plurality of locations and, for each location, an RSSI associated with the location.

6. The system of claim 4 wherein the antenna is stationary.

7. The system of claim 4 wherein:
the RFID tag is attached to an object; and
and the data processing system is configured to determine a path of motion and a direction of motion for the object based upon the path of motion and the direction of motion determined for the RFID tag.

8. A system comprising:
a memory configured to store a sequence of signal strength indicators (RSSIs) corresponding to a sequence of readings taken from a radio frequency identification (RFID) tag; and
a processor coupled with the memory, the processor configured to determine motion-related information for the RFID tag based upon the sequence of RSSIs, the motion-related information comprising information indicative of a path of motion of the RFID tag and information indicative of a direction of motion of the RFID tag along the path.
wherein the memory is configured to store reference information comprising a plurality of RSSI vectors, each vector comprising a sequence of RSSIs and being associated with information indicative if a path of motion and a direction of motion; and
the processer is configured to:
determine, from the plurality of vectors, a vector with smallest Euclidian distance to the sequence of RSSIs corresponding to the sequence of reading taken from the RFID tag; and
output a path of motion and a direction of motion information associated with the determined vector as the path of motion and the direction of motion of the RFID tag.

9. The system of claim 8 wherein:
the reference information is obtained using Hidden Markov Model (HMM) processing.

10. A system comprising:
a memory configured to store a sequence of signal strength indicators (RSSIs) corresponding to a sequence of readings taken from a radio frequency identification (RFID) tag; and
a processor coupled with the memory, the processor configured to determine motion-related information for the RFID tag based upon the sequence of RSSIs, the motion-related information comprising information indicative of a path motion of the RFID tag and information indicative of a direction of motion of the RFID tag alone the path,
wherein the memory is configured to store reference information comprising a plurality of RSSI vectors, each vector comprising a sequence of RSSIs, each vector associated with a label indicative of a path of motion and a direction of motion; and the processor is configured to:
 - determine a set of multiple vectors from the plurality of vectors with smallest Euclidian distances to the sequence of RSSIs corresponding to the sequence of readings taken from the RFID tag;
 - determine, from labels associated with the set of vectors, a label associated with most vectors in the set of vectors; and
 - output a path of motion and direction of motion information indicated by the determined label as the path of motion and the direction of motion of the RFID tag.

* * * * *